United States Patent

McDonough

[15] 3,673,540

[45] June 27, 1972

[54] INDICATING DEVICE FOR TUNING APPARATUS

[72] Inventor: Robert M. McDonough, Philadelphia, Pa.

[73] Assignee: Philco-Ford Corporation, Philadelphia, Pa.

[22] Filed: Jan. 26, 1971

[21] Appl. No.: 109,826

[52] U.S. Cl. ..............................................338/196, 338/180

[51] Int. Cl. ...........................................................H01c 9/02

[58] Field of Search ..............334/7; 338/118, 128, 133, 160, 338/176, 180, 183, 196, 197, 199

[56] References Cited

UNITED STATES PATENTS 3,568,113 3/1971 Hopt.................................338/128 X 2,620,418 12/1952 Knowles............................338/197 X

FOREIGN PATENTS OR APPLICATIONS 906,740 9/1962 Great Britain.........................338/180

1,926,199 12/1969 Germany...............................338/180

*Primary Examiner*—Lewis H. Myers
*Assistant Examiner*—Gerald P. Tolin
*Attorney*—Carl H. Synnestvedt

[57] ABSTRACT

A lead screw operated potentiometer used in a VVC tuning system for a television receiver is provided with a station indicator driven by the tracking arm of the potentiometer, and visible through a transparent dust cover that is snapped-over the potentiometer body.

4 Claims, 5 Drawing Figures

INVENTOR.
ROBERT M. McDONOUGH
BY
Harry W. Hargis III
AGENT

INDICATING DEVICE FOR TUNING APPARATUS

BACKGROUND OF THE INVENTION

This invention relates to indicating devices for tuners, and more particularly to improvements in devices for indicating the station settings for VVC tuning systems in television receivers.

In tuning systems of the aforementioned type it is a practice to provide means for indicating the UHF channel associated with one of several push-button control elements. In a typical VVC tuning system, each of several push-button control elements has associated therewith a linear potentiometer that provides for fine tuning, and it is a broad objective of my invention to provide simple, inexpensive means for indicating the potentiometer setting to afford ready identification of the particular selected channel.

It is a further, and more specific, objective of the invention to provide a novel indicating means for a lead screw potentiometer. The invention is featured by the fact that a dust seal cover for the potentiometer serves also to retain the indicating means properly assembled with the potentiometer.

In achievement of the foregoing as well as other objectives, the invention contemplates, in a lead screw potentiometer of the type having an elongate, open-sided housing, a lead screw extending along the length of said housing and supported for rotation therein, means for rotating said lead screw, a resistance element in said housing and substantially co-extensive with said lead screw, and a contact carriage driven with said lead screw and including a sliding contact engaging said resistance element, the improvement comprising: an indicator slidable with said carriage and positioned for viewing through the open side of said housing; and a transparent cover extending over said side through which said indicator is visible, and retaining said indicator in assembly.

The manner in which the foregoing as well as other general objectives and advantages of the invention may best be achieved will be understood from a consideration of the following description, taken in light of the accompanying drawing.

DESCRIPTION OF THE PREFERRED EMBODIMENT

Figures 1, 2, 3, 4, 5:
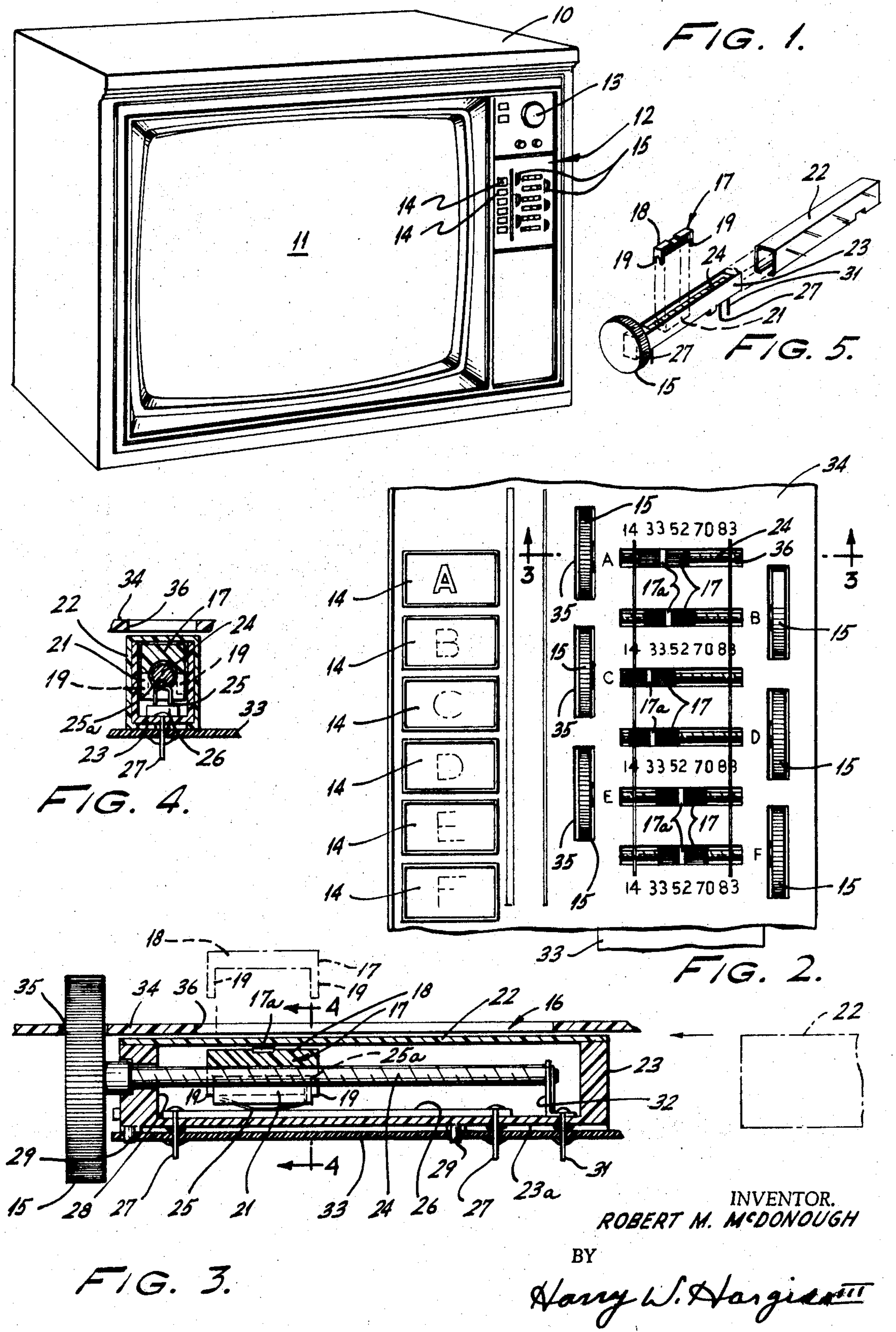
FIG. 1 is a perspective showing of a television receiver provided with a VVC tuning system embodying the invention.
FIG. 2 is an elevational showing, on a larger scale, of a portion of the receiver shown in FIG. 1, with parts broken away to illustrate the lead screw potentiometers, used in the tuning system, and certain associated structure.
FIG. 3 is a sectional view taken along the line 3—3 as applied to the potentiometer and associated structure shown in FIG. 2.
FIG. 4 is a sectional view looking in the direction of line 4—4 applied to FIG. 3.
FIG. 5 is an exploded perspective view of the potentiometer illustrated in FIGS. 3 and 4.

With reference to FIG. 1, a television receiver of known type includes a cabinet 10, a viewing screen 11, and manually operable control elements designated generally by the numeral 12. Control elements 12 include a VHF channel selector knob 13, and, with reference to FIG. 2, a series of push buttons 14 lettered A to F and usable, for UHF channel selection, in combination with a like number of fine tuning knobs 15 correspondingly lettered A to F.

With reference also to FIGS. 3 and 4, each of the knobs 15 is drivingly coupled to a corresponding linear potentiometer 16. Each of the potentiometers 16 comprises an open-sided housing 23 and a lead screw 24 extending the length of the housing and supported for rotation in end wall 28 and on bearing post 32, as shown. Knob 15 is attached to the end of lead screw 24 with which a carriage or tracking arm 21 is threadedly engaged. As is best seen in FIG. 4, carriage 21 includes a spring contact 25 provided with a first, transversely extending portion **25*a* that makes electrical connection with screw 24. A second portion of contact 25 extends into sliding electrical connection with a resistor 26 of known type spaced laterally from the lead screw and supported on the side wall of housing 23 opposite the open side. In especial accordance with the invention, and as will be described in more detail, an indicator 17 is slidable with the potentiometer carriage 21, confronting the open side, and is visible through a transparent dust cover 22 which closes said open side of housing 23**.

Further,as seen to advantage in FIG. 3, a pair of electrical connector pins 27 extend from ends of resistor 26 and through the lower side wall **23*a* of housing 23. A third connector pin 31 extends from electrically conductive bearing post 32 for screw 24 and through the same side wall 23*a* of housing 23 as do pins 27. Electrical connector pins 27 and 31, together with spacer pins 29 on wall 23*a*, serve to mount the potentiometers on a printed wiring panel 33 disposed adjacent an apertured panel 34. Potentiometer knobs 15 extend through one set of apertures 35 in panel 34, and indicators 17 are disposed for viewing through a set of elongate apertures 36 in the panel (FIG. 2). Scales indicative of the UHF stations are provided on panel 34 adjacent each of the apertures 36**.

Carriage 21 comprises a body of electrically insulative material of generally elongate block shape and, as is seen to advantage in FIG. 4, having a semicylindrical groove portion that partially receives lead screw 24. The transversely extending portion **25*a* of spring contact 24 projects into the threads on screw 24** to provide the necessary threaded interengagement between the carriage and the screw.

With reference to FIG. 5, and in further accordance with the invention, indicator 17 comprises a planar, rectangular member or body portion 18 having projecting therefrom a pair of leg portions 19 at each end that are disposed astride lead screw 24 and abuttingly engage the substantially flat end portions of carriage 21 (FIG. 3). Transparent dust cover 22 overlies indicator 17 and prevents its disassembly from carriage 21. Pointer means, such as line **17*a* on indicator 17, is visible through cover 22, and extends transversely of the scale to indicate generally the UHF channel to which a corresponding push button is tuned. For example, in the apparatus as illustrated in FIG. 2, the uppermost button 14 has been pushed to illuminate and display the letter A, indicating to the user that fine tuning for that selected station may be achieved by adjusting the uppermost knob 15 labelled with the letter A. The remaining buttons 14 have been lettered in phantom, from B to F, to illustrate their correspondence to the knobs 15 and to the scales lettered from B to F. On pushing any button, only its corresponding letter will be displayed. Apparatus for providing such display is well known in the art, and since it forms no part of the present invention, it will not be described further. By fine tuning of each of the stations A to F, each of the indicators 17** will be positioned in correspondence with its associated channel, thereby to serve as a permanent identification.

It will be appreciated that the present invention affords an inexpensive, simple, and accurate means for indicating a selected UHF channel. Moreover, and as is more fully appreciated from FIG. 5, the apparatus contemplated by the invention is readily assembled into a complete unit for attachment to a wiring panel by installing indicator 17 over carriage 21 of a linear potentiometer as described, followed by slipping transparent cover 22 over the potentiometer housing 23 as shown.

I claim:

1. In a potentiometer of the lead screw operated type including an elongate, open-sided housing, a lead screw extending along the length of said housing and supported for rotation therein, means for rotating said lead screw, a resistance element in said housing and generally coextensive with said lead screw, and a carriage driven by said lead screw including a sliding contact engaging said resistance element, the improvement comprising: indicator means slidable with said carriage and positioned for viewing through the open side of said housing, said indicator means comprising a generally rectangular body portion provided with pointer means and having projecting end portions disposed astride said lead screw and abuttingly engaging end portions of said carriage; and a cover for said housing including a transparent region extending over at least said open side of said housing, said cover closely overlying said rectangular body portion of said indicator, and positioned to retain the latter in its recited assembled association with said carriage.

2. A potentiometer as stated in claim 1, and characterized in that said housing is of a generally box-shaped configuration having spaced confronting side walls disposed to either side of, and parallel to, the longitudinal axis of said lead screw, and further in that the recited generally rectangular body portion of said indicator means slidably engages both said confronting side walls of said housing and the recited cover, in retention of said indicator.

3. In combination with the potentiometer as stated in claim 2: a wiring panel; and an indicia-bearing apertured panel spaced from and confronting said wiring panel, said potentiometer being supported on said wiring panel and in registry with an aperture on said indicia-bearing panel.

4. A potentiometer as stated in claim 2, and characterized further in that said cover is of a transparent material having a generally box-shaped configuration corresponding to the shape and size of said housing, and in that said cover is slidably fitted on said housing for frictional retention thereon.

* * * * *